United States Patent
Flynn et al.

(10) Patent No.: US 9,916,679 B2
(45) Date of Patent: Mar. 13, 2018

(54) DEEPSTEREO: LEARNING TO PREDICT NEW VIEWS FROM REAL WORLD IMAGERY

(71) Applicant: Google Inc., Mountain View, CA (US)

(72) Inventors: John Flynn, Los Angeles, CA (US); Keith Snavely, Menlo Park, CA (US); Ivan Neulander, Mountain View, CA (US); James Philbin, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 28 days.

(21) Appl. No.: 15/154,417

(22) Filed: May 13, 2016

(65) Prior Publication Data

US 2016/0335795 A1   Nov. 17, 2016

Related U.S. Application Data

(60) Provisional application No. 62/161,159, filed on May 13, 2015.

(51) Int. Cl.
| | |
|---|---|
| *G06T 15/20* | (2011.01) |
| *G06K 9/00* | (2006.01) |
| *G06K 9/62* | (2006.01) |
| *G06K 9/46* | (2006.01) |

(52) U.S. Cl.
CPC .......... *G06T 15/20* (2013.01); *G06K 9/00664* (2013.01); *G06K 9/4628* (2013.01); *G06K 9/4652* (2013.01); *G06K 9/6272* (2013.01); *G06T 15/205* (2013.01)

(58) Field of Classification Search
CPC ............ G06T 2207/20081; G06T 2207/20084
See application file for complete search history.

(56) References Cited

U.S. PATENT DOCUMENTS

| | | | | |
|---|---|---|---|---|
| 2004/0101043 A1* | 5/2004 | Flack | ........................ | H04N 5/85 375/240.01 |
| 2010/0322489 A1* | 12/2010 | Tizhoosh | ............. | G06K 9/6253 382/128 |

(Continued)

FOREIGN PATENT DOCUMENTS

WO   98/47097 A1   10/1998

OTHER PUBLICATIONS

Savarese et al.,"View Synthesis for Recognizing Unseen Poses of Object Classes", 2008, ECCV 2008, Part of the Lecture Notes in Computer Science book series (LNCS, vol. 5304), pp. 602-615.*

(Continued)

*Primary Examiner* — Barry Drennan
*Assistant Examiner* — Phong Nguyen
(74) *Attorney, Agent, or Firm* — Brake Hughes Bellermann LLP

(57) ABSTRACT

A system and method of deep learning using deep networks to predict new views from existing images may generate and improve models and representations from large-scale data. This system and method of deep learning may employ a deep architecture performing new view synthesis directly from pixels, trained from large numbers of posed image sets. A system employing this type of deep network may produce pixels of an unseen view based on pixels of neighboring views, lending itself to applications in graphics generation.

18 Claims, 9 Drawing Sheets

(56) References Cited

U.S. PATENT DOCUMENTS

| | | | |
|---|---|---|---|
| 2012/0250982 A1* | 10/2012 | Ito | G06T 7/0042 |
| | | | 382/159 |
| 2013/0016877 A1* | 1/2013 | Feris | G06K 9/00771 |
| | | | 382/103 |
| 2013/0127895 A1 | 5/2013 | Miller et al. | |
| 2015/0063681 A1* | 3/2015 | Bhardwaj | G06F 17/30277 |
| | | | 382/154 |
| 2015/0117760 A1* | 4/2015 | Wang | G06K 9/66 |
| | | | 382/157 |
| 2015/0139485 A1* | 5/2015 | Bourdev | G06K 9/00362 |
| | | | 382/103 |
| 2015/0324690 A1* | 11/2015 | Chilimbi | G06N 3/063 |
| | | | 706/25 |
| 2015/0347819 A1* | 12/2015 | Yin | G06K 9/00221 |
| | | | 382/118 |
| 2016/0035078 A1* | 2/2016 | Lin | G06T 7/0002 |
| | | | 382/157 |
| 2016/0219325 A1* | 7/2016 | Chu | H04N 21/42653 |
| 2016/0328643 A1* | 11/2016 | Liu | G06N 3/084 |

OTHER PUBLICATIONS

Debevec, et al., "Modeling and Rendering Architecture From Photographs: A Hybrid Geometry-and Image-Based Approach", Computer Graphics Proceedings 1996 (SIGGRAPH), Aug. 4, 1996, 33 pages.

Goorts et al., "An end-to-end system for free viewpoint video for smooth camera transitions", 2012 International Conference on 3D Imaging (IC3D), Dec. 3, 2012, 7 pages.

International Search Report and Written Opinion for PCT Application No. PCT/US2016/032410, dated Aug. 24, 2016, 17 pages.

Takahashi, et al.,"Super-Resolved Free-Viewpoint Image Synthesis Based on View-Dependent Depth Estimation", IPSJ Transactions on Computer Vision and Applications, Jan. 1, 2012, pp. 134-148.

\* cited by examiner

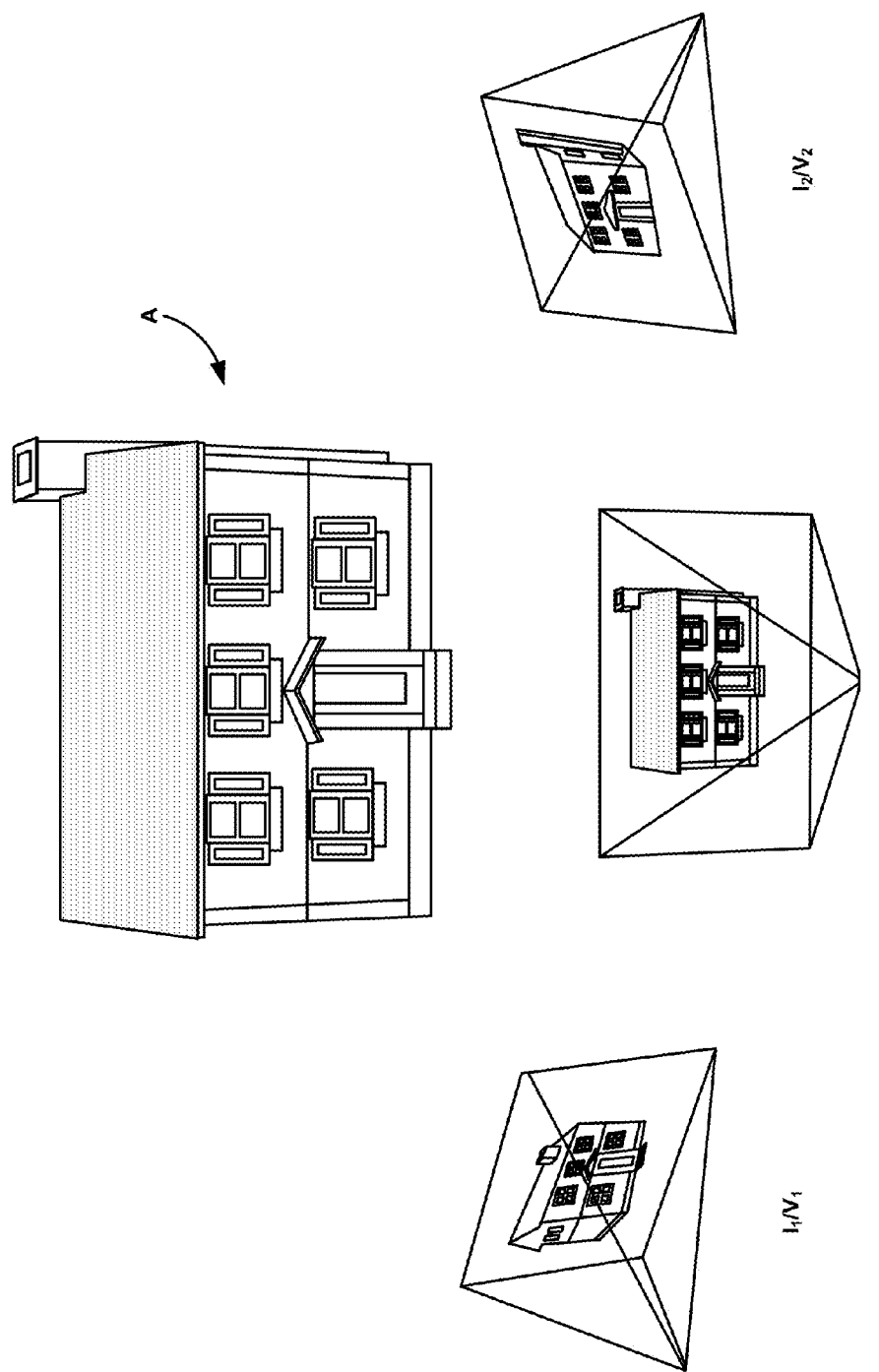

DEEPSTEREO: LEARNING TO PREDICT NEW VIEWS FROM REAL WORLD IMAGERY

This application claims priority to provisional Application Ser. No. 62/161,159, filed on May 13, 2015, the entirety of which is incorporated by reference as if fully set forth herein.

FIELD

This document relates, generally, to deep networks and deep learning associated with images.

BACKGROUND

Deep networks, and deep learning, may be applied to generate and improve models and representations from large-scale data. Deep learning may be considered part of a more broad application of machine learning. Deep learning may be based on unsupervised learning of feature representations in, for example, computer vision, garnered from multiple levels of processing/computing devices, these multiple levels of processing/computing devices forming a hierarchy from low-level to high-level features. The composition and arrangement of these multiple layers may be developed based on, for example, a particular problem to be solved.

SUMMARY

In one aspect, a method may include accessing a plurality of posed image sets from a database, the plurality of posed image sets respectively corresponding to a plurality of scenes, each of the plurality of posed image sets including a plurality of views of a corresponding scene of the plurality of scenes, generating a requested view of a scene based on views selected from the plurality of views of the scene included in the posed image set corresponding to the scene in accordance with an automated view generating algorithm, wherein the requested view of the scene is not included in the plurality of views of the scene included in the corresponding posed image set, comparing the view of the scene generated by the automated view generating algorithm to a known view of the scene, and updating the view generating algorithm based on the comparison.

In another aspect, a method may include receiving a request for a view of a scene to be rendered, accessing, from a database, a plurality of stored posed images respectively representing a plurality of views of the scene, selecting a plurality of images from the plurality of stored posed images, the selected plurality of images representing views of the scene neighboring the requested view of the scene, reprojecting depth slices of each of the selected plurality of images at a plurality of depths, determining a depth for the requested view of the scene and determining a color for each pixel of the requested view of the scene at the determined depth based on pixels at the reprojected depth slices, and generating the requested view of the scene.

In another aspect, a method may include receiving a request for a view of a scene, retrieving, from a database storing a plurality of posed image sets, each of the plurality of posed images sets including a plurality of views of a corresponding scene, a posed image set corresponding to the requested view of the scene, and generating the requested view of the scene based on selected views from the plurality of views of the scene included in the corresponding posed image set, the requested view not included in the plurality of views of the scene of the corresponding posed image set.

In another aspect, a system for generating a view of a scene may include a network. The network may include a computing device including a processor, the computing device being in communication with a database, the database storing a plurality of posed image sets respectively corresponding to a plurality of scenes, each of the plurality of posed images sets including a plurality of views of a corresponding scene of the plurality of scenes, a selection tower configured to determine a depth for each output pixel in a requested output image, the requested output image corresponding to a requested view of a scene, and a color tower configured to generate a color for each output pixel of the requested output image. The selection tower and the color tower may be configured to receive selected views from the plurality of views of the scene included in the posed image set corresponding to the requested view of the scene, the requested view of the scene not being included in the plurality of views of the scene of the corresponding posed image set. The selection tower and the color tower may be configured to generate the requested output image for processing by the processor of the computing device to generate the requested view of the scene.

The details of one or more implementations are set forth in the accompanying drawings and the description below. Other features will be apparent from the description and drawings, and from the claims.

BRIEF DESCRIPTION OF THE DRAWINGS

FIGS. 1A and 1B illustrate new views rendered from existing images, in accordance with implementations described herein.

DETAILED DESCRIPTION

Figure 1B:
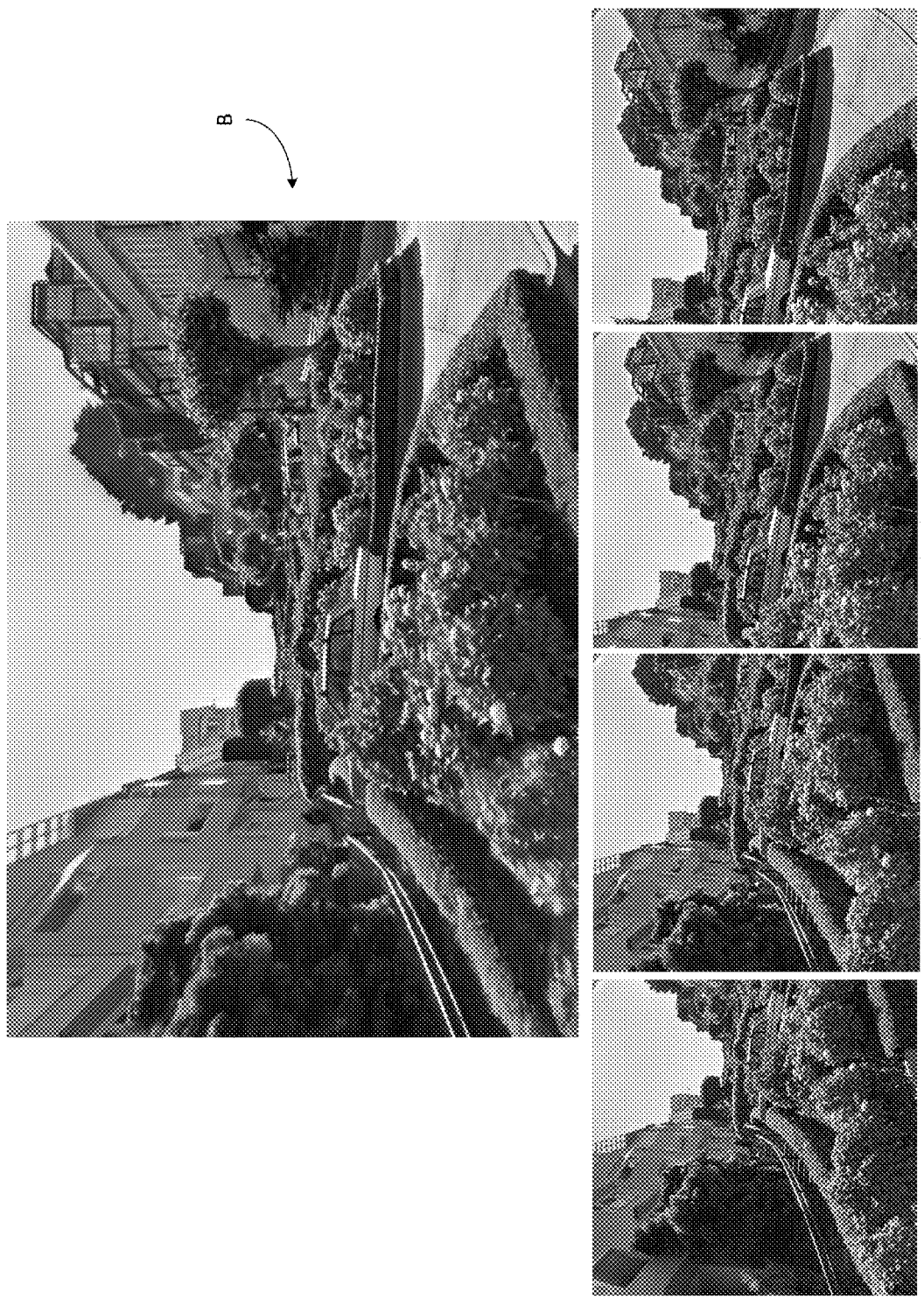

Deep networks may be applied to various different types of recognition and classification problems. In a system and method, in accordance with implementations as described herein, deep networks may be applied to recognition and classification problems in computer vision and graphics using, for example, a deep architecture that learns to perform new view synthesis directly from a large number, such as, for example, millions, of posed image sets, for example, sets of images having known characteristics, such as, for example, perspective and/or color and/or depth. For example, in a system and method in accordance with implementations described herein, a deep network may be trained from this relatively large number of posed image sets, and then, in operation, may rely on a relatively small number of pertinent images to generate a new, previously unseen view based on the training conducted with the large number of posed image sets.

In contrast to relying on multiple complex stages of processing, a system and method in accordance with implementations described herein may be trained end-to-end, by, for example, presenting images, for example pixels of images, of neighboring views of a scene to the network to directly produce images of an unseen arbitrary/requested view of the scene. The requested view may be, for example, a view of a subject, or subject area, from a particular perspective and/or point of view and/or depth. The neighboring images may be, for example, images available from the posed image sets adjacent to the requested view. For example, in some implementations, the system may be trained by presenting a set of input images of various views of a scene, requesting a view not included in the set of input images, and then presenting the network with the image that should be produced in response to the request. In some implementations, for view synthesis, one or more sets of posed images may used as training set(s) by removing one image and setting it aside, and then reproducing the removed image from the remaining images. Relatively large amounts of data, mined from a relatively expansive database may be used to train models, in accordance with implementations described herein. An example of this type of data base is a street view mapping database, which contains a massive collection of posed imagery spanning much of the globe. Although this example may be referred to hereinafter, where appropriate for ease of explanation and illustration, the principles discussed herein may be applied to other implementations making use of other such expansive collections of data.

Through repetition, taking advantage images/views available in a large scale database (such as, for example, a street view mapping database), the system may continuously learn and refine it process to produce the requested image. This end-to-end approach may allow for a certain level of generality, relying on posed image sets and applying to different domains, and filling in unseen pixels based on various features such as color, depth and texture learned from previous data. This approach may reduce the occurrence of artifacts, due to, for example, occlusions and ambiguity, when generating view interpolation and view-synthesized omni-directional stereo imagery, and may produce a relatively high quality result for a relatively difficult scene to synthesize.

Estimating a three-dimensional (3D) shape from multiple posed images may be a fundamental task in generating 3D representations of scenes that can be rendered and edited. In some implementations, novel view synthesis may be performed by a form of image based rendering (IBR) where a new view of a scene is synthesized by warping and combining images from nearby posed images of the scene to synthesize the new view of the scene. This approach may be applied to, for example, augmented and/or virtual reality systems, teleconferencing systems, 3D monocular film systems, cinematography, image stabilization, and other such implementations. In addition to techniques involving multi-view stereo or image warping methods, which may model the stereo, color, and occlusion components of each target pixel, a system and method in accordance with implementations described herein may leverage deep networks to directly learn to synthesize new views from posed images.

In this type of approach to new view synthesis, deep networks may be used to regress directly to output pixel colors given posed input images. This system may interpolate between views separated by a wide baseline due, for example, to the end-to-end nature of the training, and the ability of deep networks to learn extremely complex non-linear functions related to the inputs. In a system and method in accordance with implementations described herein, minimal assumptions about the scene being rendered may include, for example, a relatively static nature of the scene within a finite range of depths. Even outside of these parameters, the resulting images may degrade relatively gracefully and may remain visually plausible. In addition to application to synthesis of new views, a system and method making use of the deep architecture as described herein may also apply to other stereo and graphics problems given suitable training data.

For example, as shown in FIG. 1A, a new view $C_V$ of a given scene A, such as the house shown in FIG. 1A, may be rendered by the network from existing first and second images $I_1$ and $I_2$ at first and second viewpoints $V_1$ and $V_2$, respectively, without additional information related to the new view $C_V$. Similarly, a new view $C_V$ of a given scene B, such as the outdoor scene shown in FIG. 1B, may be rendered by the network from existing multiple images $I_1$ through $I_n$, each at a different respective viewpoint $V_1$ through $V_n$, without additional information related to the new view $C_V$.

Application of deep networks to image understanding and interpretation may, in some implementations, provide a basis for applying deep learning to graphics generation, and in particular, to depth and stereo associated with particular graphics applications. Further, improved performance may be achieved by using many layers of small convolutions and pooling, to pooling to address the large number of parameters associated with deep networks which may cause these systems to otherwise be prone to over-fitting in the absence of large quantities of data.

A system and method, in accordance with implementations described herein, may make minimal assumptions about the scene being rendered as discussed above, such as, for example, that the scene is static and that the scene exists within a finite range of depths. In some implementations, a model may generalize beyond the training data to novel imagery, including, for example, image collections used in prior work.

Figure 2:
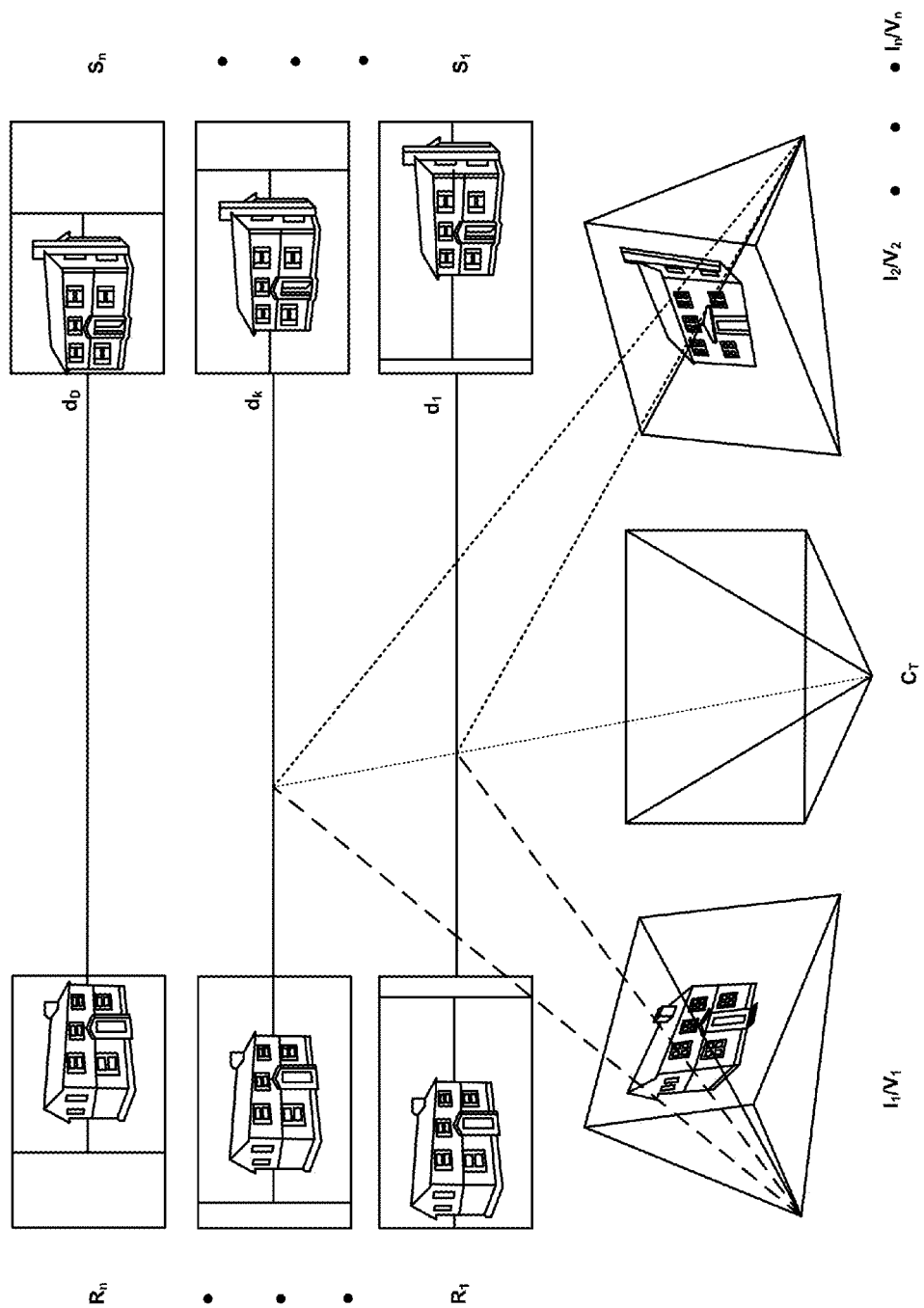
FIG. 2 illustrates a plane sweep stereo re-projection of various images from various views to a new target camera field of view at a range of depths, in accordance with implementations described herein.

As shown in FIG. 2, given a set of posed input images $I_1$ through In, a new image may be rendered from the viewpoint of a new target camera $C_T$, the new target camera $C_T$ representing a capture field of view, or new viewpoint, associated with the new scene to be generated from the posed input images $I_1$ through $I_n$. In FIG. 2, plane sweep stereo reprojects the posed input images $I_1$ and $I_2$ from viewpoints $V_1$ and $V_2$, respectively, to the target camera $C_T$ at numerous different depths, for example, from a minimum depth $d_1$ to a maximum depth $d_D$, with one or more reprojected images of the posed input images $I_1$ and $I_2$ taken an one or more intermediate depths $d_k$. For example, reprojected images $R_1$ through $R_n$ of the posed input image $I_1$ may be generated at depths ranging from $d_1$ to $d_D$, and reprojected images $S_1$ through $S_n$ of the posed image input $I_2$ may be generated at depths ranging from $d_1$ to $d_D$. In FIG. 2, the dotted lines may indicate pixels from the input images $I_1$ and $I_2$ reprojected to a particular output image pixel $R_1$ through $R_n$, $S_1$ through $S_n$.

One approach to rendering the new image may be to naively train a deep network to synthesize new views by directly supplying input images to the network. In this approach, the pose parameters of the new viewpoint (the new view $C_V$ to be generated, corresponding to the new target camera $C_T$ field of view) may be supplied as inputs to the network to produce the desired view/image. Due to the complex, non-linear relationship of the pose parameters, the input images and the output image, this also involves the network learning how to interpret rotation angles and how to perform image re-projection, which may be an inefficient use of network resources. Additionally, in this approach, the network may compare and combine potentially distant pixels in the original input images to synthesize a new view, driving a need for relatively dense, long range connections in the network, causing the network to be slow to train and prone to over-fitting, particularly when dealing with large scale data. In some instances, this could be addressed by a network structure configured apply an internal epipolar constraint to limit connections to hose on corresponding epipolar lines. However, this type of structure may be pose-dependent and computationally inefficient, particularly when dealing with large scale data.

As described above, the series of input images $I_1$ through In from viewpoints $V_1$ through $V_n$, respectively, may be re-projected at different distances between $d_1$ and $d_D$ with respect to the viewpoint, or new target camera $C_T$, from which a new/requested view $C_V$ is to be rendered, rendering slices at these different re-projection distances. The system may sweep through the range of depths (for example, in some implementations, 64 to 96 different depths), from a position that is relatively close to the new target camera $C_T$ (for example, approximately 2 m from the new target camera $C_T$ in the case of a street view) to a position that is relatively far from the new target camera $C_T$ (for example, approximately 30 meters, or more, from the new target camera $C_T$ in the case of a street view, at given intervals. In some implementations, the system may step through the range of depths at an inverse distance, or 1/distance, for example, a minimum interval of 1/max distance $d_D$, or another interval based on another distance between the minimum distance d1 and the maximum distance $d_D$. From these re-projected depth slices, a re-projected depth slice for each input view may be generated, with numerous images for each re-projected depth slice available (for example, 4-5 input views, each with 4-5 images per depth slice). For example, pixels of a left re-projected image and pixels of a right projected image may (respectively) align at the correct depth. The re-projected depth slices may be combined to produce the best color for that depth slice, and to determine the correct depth for a particular pixel/image. The network may determine the correct depth and the correct depth slice for a particular pixel, and then the correct color. These elements may be learned together. The network may then determine, or learn, the probability that a particular pixel is at a particular depth slice, multiply that probability by the computed color, and sum this to produce a final image.

More specifically, in a system and method in accordance with implementations described herein, a network may include a set of 3D plane sweep volumes as input. A plane sweep volume (PSV) may include, for example, a stack of images re-projected to the new target camera $C_T$. Each image in the stack may be re-projected into the new target camera $C_T$ at a set of varying depths $d \in d_1 \ldots d_D$ to form a plane sweep volume $V_C = P_1 \ldots P_d \ldots P_D$. That is, as shown in FIG. 2, plane sweep stereo may re-project images $I_1$, $I_2$ from $V_1$ and $V_2$ to the new target camera $C_T$ at a range of depths $d \in d_1 \ldots d_D$. Re-projecting an input image into the target camera C may be done using, for example, texture mapping, and may be performed by a graphics processing unit (GPU). A separate plane sweep volume $V_k^C$ may be generated for each input image. Each voxel $v_{x, y, z}$ in each plane sweep volume $V_k^C$ may have R, G, B and A (alpha) components, the alpha channel indicating the availability of source pixels for that particular voxel.

By using plane sweep volumes as inputs to the network, the pose parameters may be implicit inputs used in the construction of the plane sweep volume, rather than separately supplied inputs. Additionally, the epipolar constraint may be trivially enforced within a plane sweep volume, as corresponding pixels are now arranged in corresponding columns of the plane sweep volume. Thus, long range connections between pixels/images are not needed, and a given output pixel/image depends only on a small column of voxels from each of the per-source plane sweep volumes. Similarly, as a computation performed to produce an output pixel p at location i,j is largely independent of a location of the pixel pi, j, a convolutional neural network, which may involve fewer parameters than fully connected networks and thus may be faster to train, may be used. It may also be faster to run inference on a convolutional neural network, and computation from earlier layers may be shared. For example, in one embodiment, a model may apply two-dimensional (2D) convolutional layers to each plane within the input plane sweep volume. In addition to sharing weights within convolutional layers, the model may also take advantage of weight sharing across planes in the plane sweep volume, this allowing the computation performed on each plane to be independent of the depth of the plane.

In some implementations, a model may include two towers of layers, where the input to each tower is the set of plane sweep volumes $V_k^c$. This dual architecture may allow for both depth prediction and color prediction. For example, in depth prediction, an approximate depth for each pixel in the output image may be determined to in turn determine the source image pixels to be used to generate the output pixel. This probability over depth may be computed using training data, rather than a sum of squared distances (SSD) approach, a normalized cross correlation (NCC) approach, or a variance approach. In color prediction, a color for the output pixel, given all of the relevant source image pixels, may be produced by optimally combining the source pixels using training data, rather than just performing simple averaging.

Figure 3:
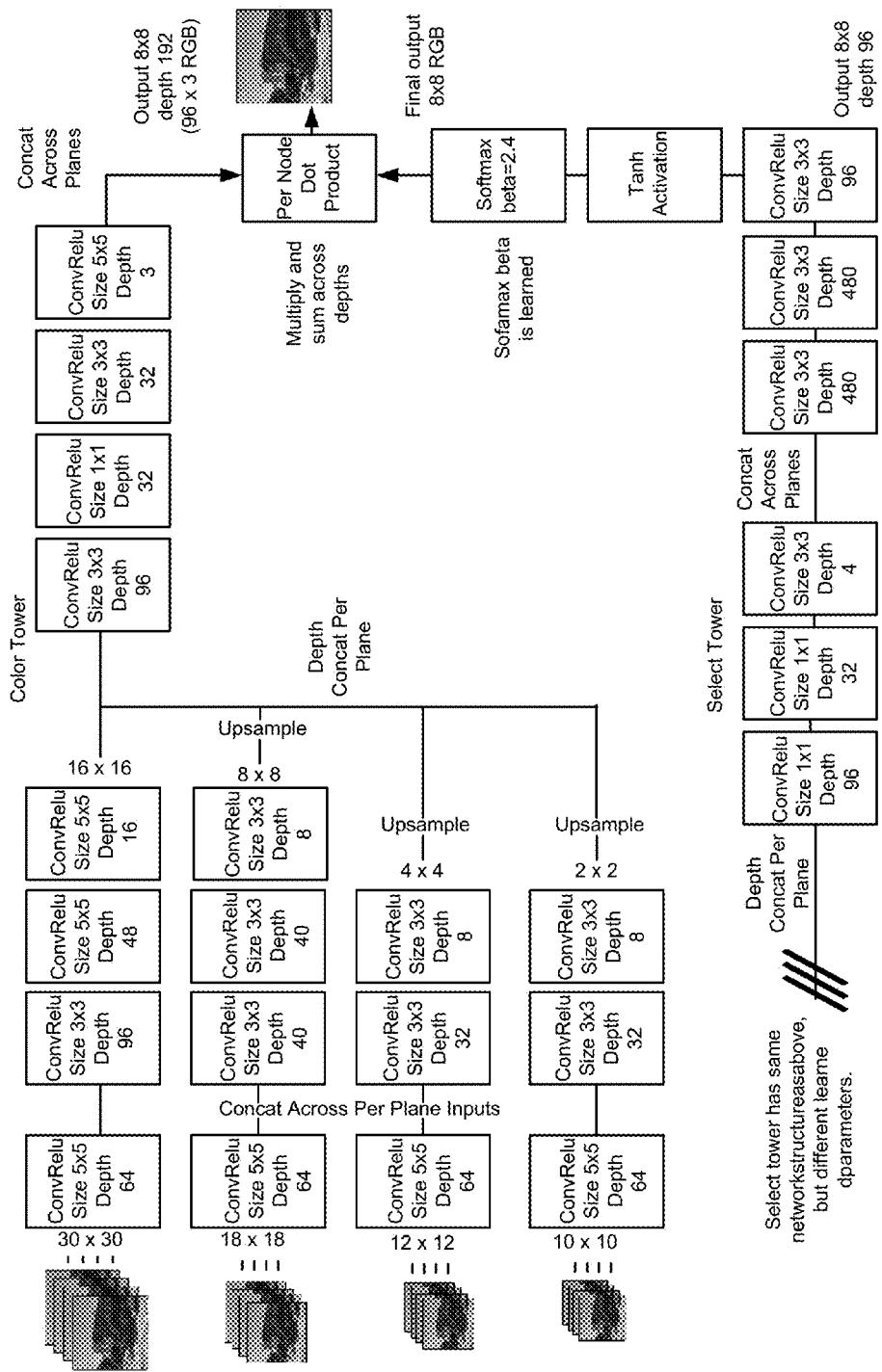
FIGS. 3 and 4 illustrate a network including a selection tower and a color tower, in accordance with implementations described herein.

The two towers shown in FIG. 3 may accomplish the tasks of depth prediction and color prediction. The selection tower may generate a probability map (or selection map) for each depth indicating a likelihood of each pixel having a particular depth. The color tower may generate a full color output image for each depth. For example, the color tower may produce the best color possible for each depth, assuming that the depth is correct for that particular pixel. The color images may then be combined as a per-pixel weighted sum, with weights drawn from the selection maps. That is, the selection maps may be used to determine the best color layers to use for each output pixel. This approach to view synthesis may allow the system learn all of the parameters of both the selection tower and the color tower simultaneously, end-to-end using deep learning methods. Further, the weighted averaging across color layers may yield some resilience to uncertainty, particularly in regions where the algorithm is less confident.

Figure 4:
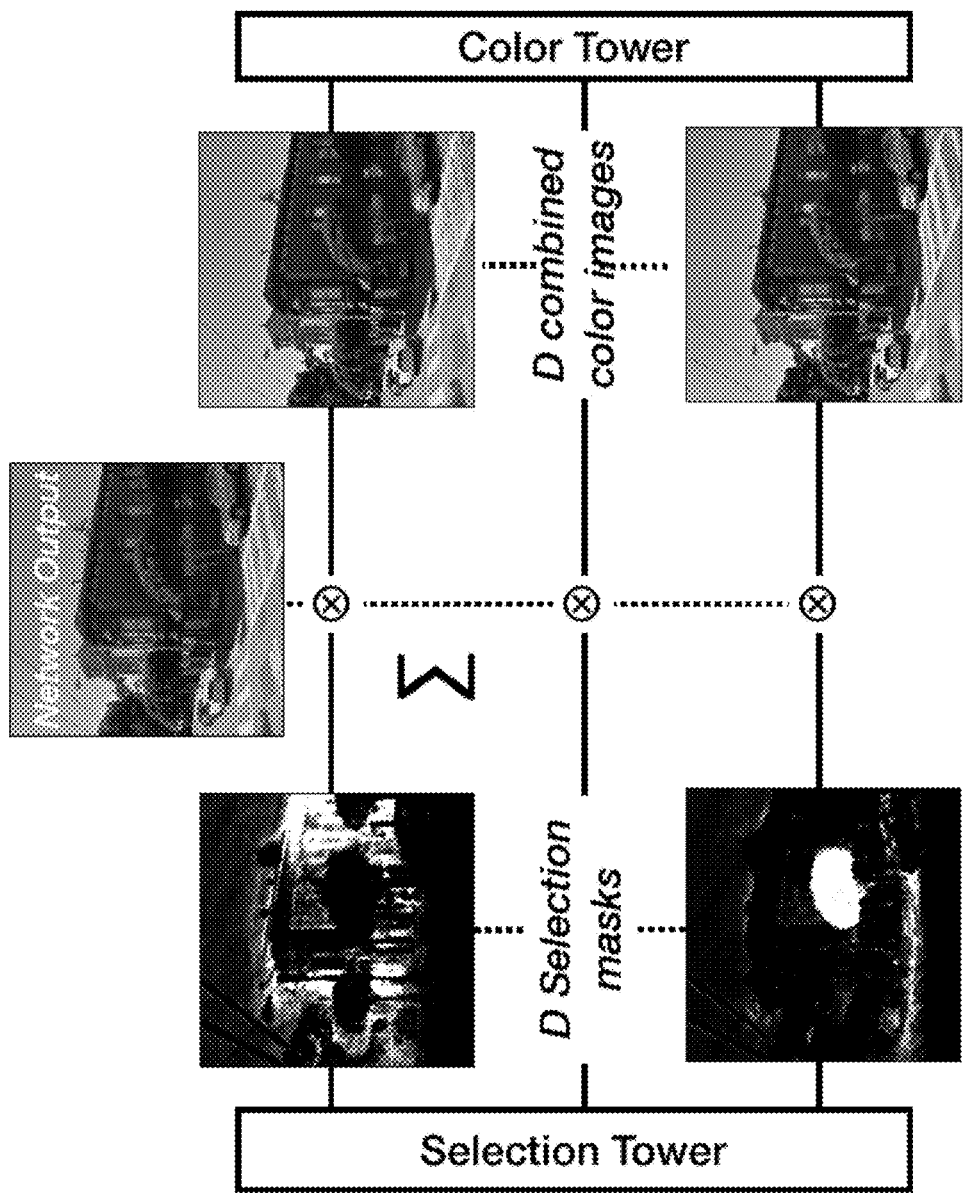
Figure 5:
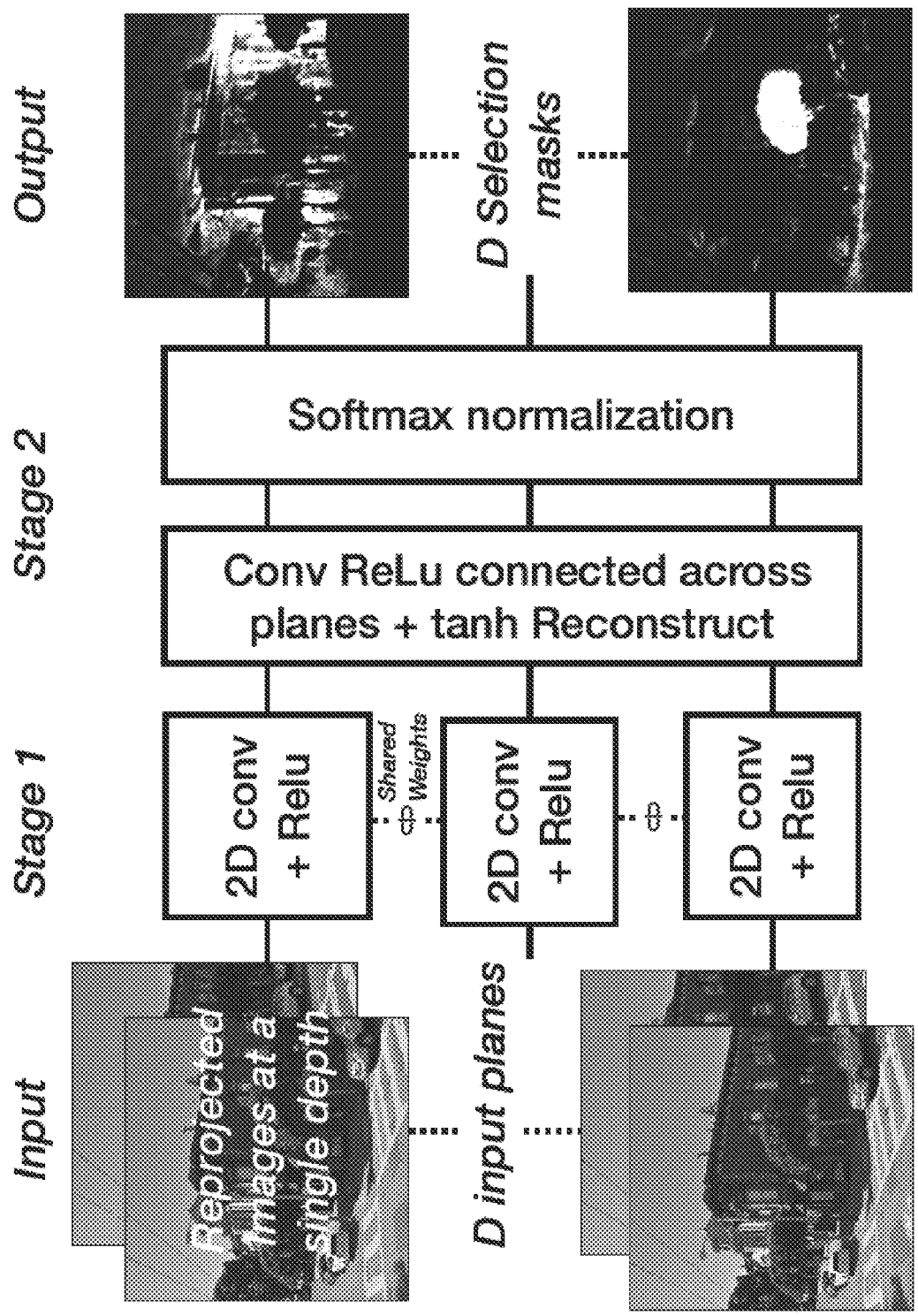
FIG. 5 illustrates a selection tower, configured to learn to produce a selection probability for each pixel in each depth plane, in accordance with implementations described herein.

In particular, the first layer of each tower may concatenate the input plane sweep volume over the source, allowing the networks to compare and combine re-projected pixel values across sources. For example, the selection tower as shown in FIGS. 3 and 4, may compute, for each pixel $p_{i,j}$, in each plane $P_d$, a selection probability $s_{i,j,d}$ for the pixel at that plane, as shown in FIG. 4. The color tower as shown in FIGS. 3 and 4, may compute for each pixel $p_{i,j}$, in each plane $P_d$, a color $c_{i,j,d}$ for the pixel at that plane as shown in FIG. 5. The final output color for each pixel may be computed by summing over the depth of the planes as shown in equation (1).

$$c_{i,j}^f = \Sigma s_{i,j,d} \times c_{i,j,d} \qquad \text{Equation (1)}$$

The input to each tower may include the set of plane sweep volumes $V_k^C$ (including all of the reprojected images N-D over all volumes, where N is the number of source images, and D is the number of depth planes). The first layer of each tower may on each reprojected image $P_k^i$ independently, allowing the system to learn low-level image features. After the first layer, the feature maps corresponding to the N sources may be concatenated over each depth plane, and subsequent layers may operate on these per-depth-plane feature maps. The final layers of the selection tower may also make use of connections across depth planes.

In some implementations, the selection tower may include two main stages. The early layers may include, for example, a number of 2D convolutional rectified linear layers that share weights across all depth planes, and within a depth plane for the first layer. For example, based on previous learning, the early layers may compute features that are independent of depth, such as pixel differences, so their weights may be shared. The final set of layers may be connected across depth planes, so that depth plane interactions between depth planes, such as those caused by occlusion (e.g., the network may learn to prefer closer planes having higher scores in cases of ambiguities in depth) may be modeled. The final layer of the network may be a per pixel softmax normalization transformer over depth, as shown in FIG. 4. The softmax transformer may cause the model to pick a single depth plane per pixel, while ensuring that the sum over all depth planes is 1. In some embodiments, using a tan h activation for the penultimate layer may yield more stable training than a linear layer. For example, under some circumstances, a linear layer may shut down at certain depth planes and not recover due to, for example, relatively large gradients associated with the softmax layer. The output of the selection tower may be a 3D volume of single channel nodes $s_{i,j,d}$ as shown in equation (2).

$$\sum_{d=1}^{D} s_{i,j,d} = 1 \qquad \text{Equation (2)}$$

As shown in FIG. 5, the color tower may include, for example, 2D convolutional rectified linear layers that share weights across all planes, followed by a linear reconstruction layer. Occlusion effects do not have the same level of relevance in the color layer, so across depth interaction may not be necessary. The output of the color tower may be a 3D volume of nodes $c_{i,j,d}$. Each node in the output may have three channels, corresponding to R, G and B.

The output of the selection tower and the color tower may be multiplied together, by node, to produce the output image. During training, the resulting image may be compared with the known target image $I^t$, or training image, using, for example, a per-pixel loss $L_1$. A total loss L may be determined in accordance with equation (3), where $c_{i,j}^f$ is the target color at the pixel i,j.

$$\sum_{i,j} |t_{i,j} - c_{i,j}^f| \qquad \text{Equation (3)}$$

Figure 6:
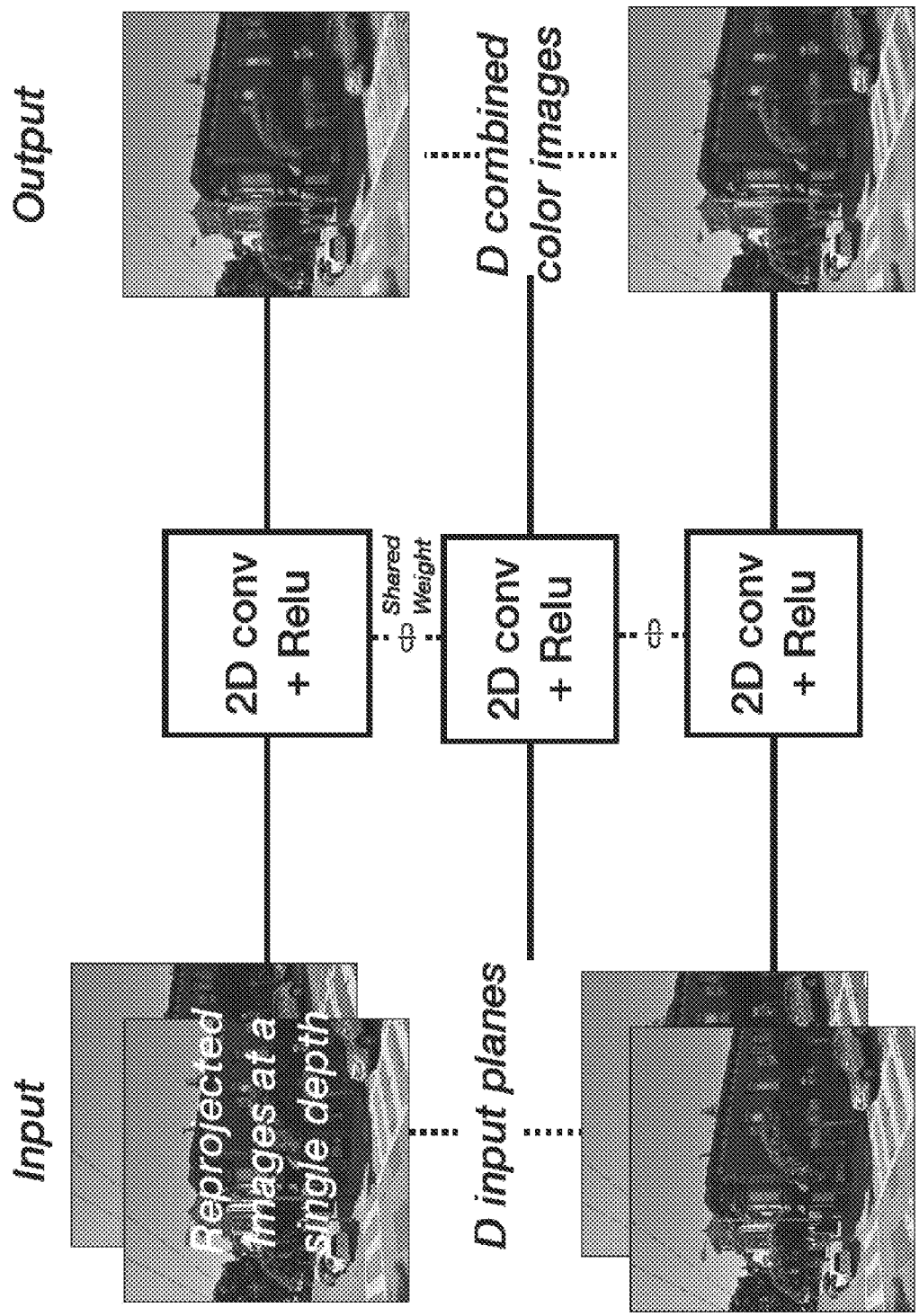
FIG. 6 illustrates a color tower, configured to learn to combine and warp pixels across sources to produce a color for a particular pixel at a plurality of depth planes, in accordance with implementations described herein.

In some implementations, rather than predicting a full image all at once, the system may predict the output image patch-by-patch. Passing in a set of lower resolution versions of successively larger areas around the input patches may improve results by providing the network with more context, wherein an improved result may indicate that the view which is predicted is more accurate. For example, in some implementations, the system may pass in four different resolutions. Each resolution may first be processed independently by several layers, and then be upsampled and concatenated before entering the final layers. The upsampling may make use of nearest neighbor interpolation. More detail of the complete network is shown in FIG. 6.

In one example implementation, as described above, a relatively large amount of data may be mined from a relatively expansive database to train models. In the example implementation described above, the massive collection of posed imagery spanning much of the globe contained by a street view database may be used to train such a model. In this example implementation, images of street scenes captured by a moving vehicle may be used to train a network. The images may be posed using, for example, odometry and structure from motion techniques. As the vehicle moves, the vehicle may intermittently capture clusters, or groupings, or rosettes, of images. For example, the vehicle may capture a rosette of images at each of a plurality of predetermined time stamps. Each rosette may include a plurality of images in a predetermined arrangement captured from predetermined point(s) of view. For example, in some implementations, each rosette may include 8 images, or 15 images, or another number of images, depending on a type of image capture device, or camera, employed. The rosettes, each including a plurality of images, may define a stream of input images.

In some implementations, training of the system may include a substantially continuously running sample generation pipeline, selecting and re-projecting random patches from the input images included in a relatively large number of rosettes. For example, in one example implementation, up to 100,000 rosettes may be included in the sample generation pipeline, and the network may be trained to produce 8×8 output patches from 26×26 input patches, as shown in FIG. 3. Patches from numerous images may be combined to generate mini-batches, having a predetermined size of, for example, 400. The network may then be trained using, for example, distributed gradient descent. Due to sample randomization, and the relatively large volume of training data available, duplicate use of any of the patches during training is highly unlikely in this example implementation.

To evaluate the effectiveness of training the network in the manner described above, two networks were trained using the same model or algorithm, but using two different types of training data. The first network was trained based on image data provided by an expansive street view database as described above. The images included in the street view database were posed using a combination of odometry and other motion methods, with a vehicle mounted camera using a rolling shutter capturing a set of images, or rosettes, as described above, with different directions for each exposure. The second network was trained using posed image sequences from a standard odometry dataset. In evaluating the performance of the first and second networks on the task of view interpolation, novel images were generated from the same viewpoint as known (but withheld) images. During training, each rosette of the street view database used to train the first network provides pixels in every direction, so the reprojected depth planes always have valid pixels. With the standard dataset used to train the second network, some parts of the depth planes were not visible from all cameras. Since the model had not encountered missing pixels during training, the missing pixels generated some error in images generated by the second network, predominantly at the boundaries of the images.

In further comparison, a baseline IBR algorithm was implemented to compute depth using the four nearest input images to splat the pixels from the two nearest images into the target view, diffusing neighboring valid pixels to fill any small remaining holes. The system and method, in accordance with implementations described herein, outperformed the baseline IBR algorithm for all spacings. The system and method, in accordance with implementations described herein, also outperformed an optical flow algorithm applied to interpolate in-between images. As there is no notion of 3D pose when implementing this type of optical flow algorithm, the interpolated image is only approximately at the viewpoint of the withheld image.

Overall, the model implemented in a system and method, in accordance with implementations described herein may produce relatively high quality output images that may be difficult to distinguish from the original, actual imagery. The model may process a variety of different types of challenging surfaces and textures, such as, for example, the trees and glass shown in FIG. 1B, with performance for specular surfaces degrading gracefully, and relatively unnoticeably. Moving objects, which may often be encountered during training, such as, for example, a flag waving in the wind in a scene, may be blurred in a fashion that evokes motion blur. An example of network learning to produce these images is illustrated in FIG. 7.

Figure 7:
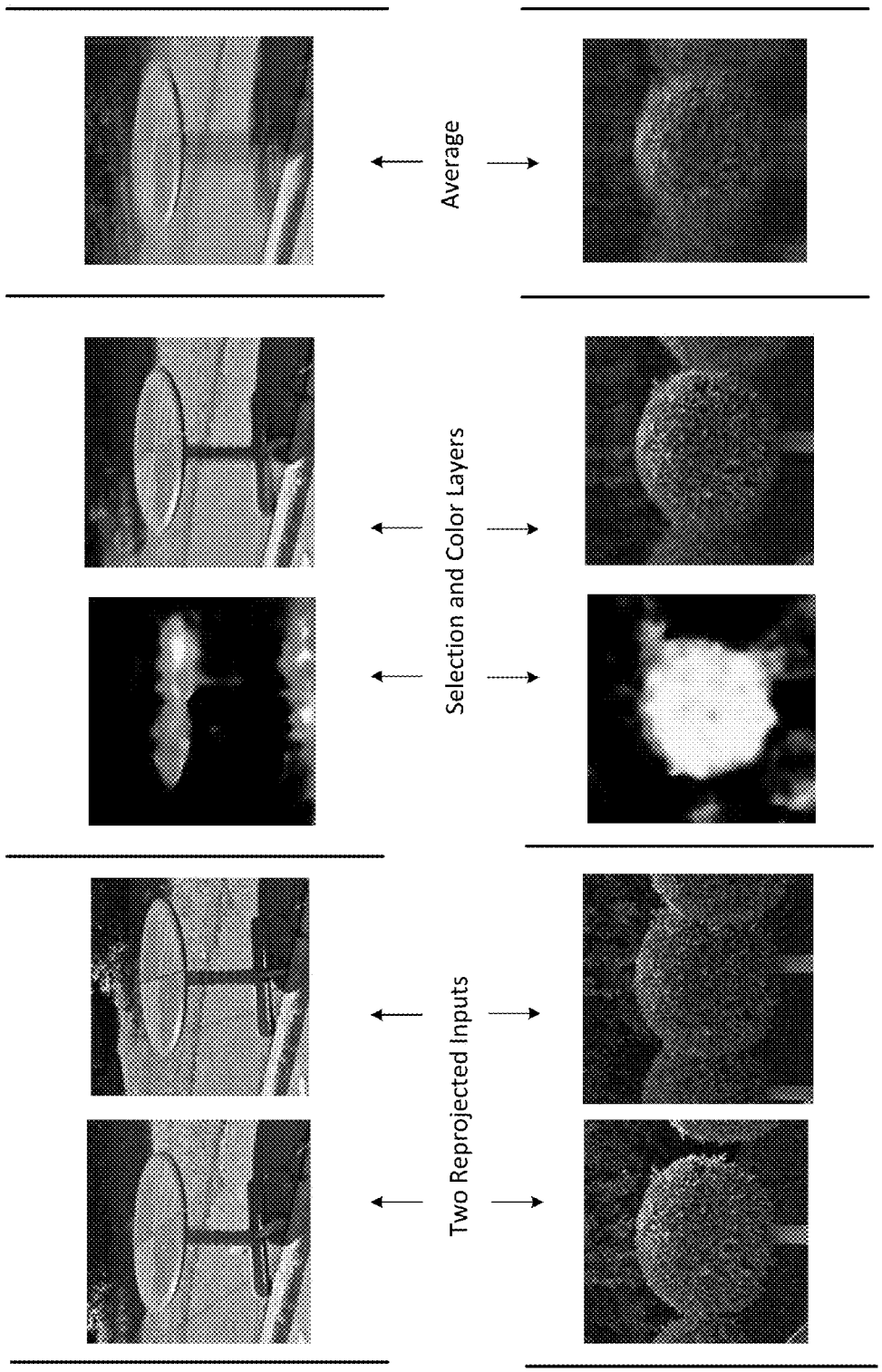
FIG. 7 illustrates two different examples of reprojected images produced by a system and method, in accordance with implementations described herein.

FIG. 7 illustrates two different examples of reprojected images produced in this manner. One image is of a table having a relatively smooth surface texture and the second image is of a tree having a more complex visual texture. These images are reprojected at a single depth plane, and have been selected so that the cropped regions represented by these images have strong selection probability at that particular plane. The reprojected input views are shown at the left portion of FIG. 7, the outputs of the selection layer and the color layer at the given depth plane are shown in the middle portion of FIG. 7, and a comparison to the average is shown in the right portion of FIG. 7. As shown in FIG. 7, the color layer may contribute more than simply averaging the input reprojected images. Rather, it may learn to warp and robustly combine the input to produce the color image for that depth plane. This may allow the system to produce depth planes that are separated by more than one pixel of disparity.

In a system and method, in accordance with implementations described herein, a deep network may be trained end-to-end to perform novel view synthesis, using only sets of posed imagery, to provide high quality, accurate, synthesized views from the sets of posed images. As noted above, a system and method for learning to predict may be implemented by deep learning, facilitated by deep networks, to generate and improve models and representations from large-scale data. The data powering such deep networks may be garnered from multiple levels of processing/computing devices, these multiple levels of processing/computing devices forming a hierarchy from low-level to high-level features, based on a particular problem to be solved.

Figure 8:
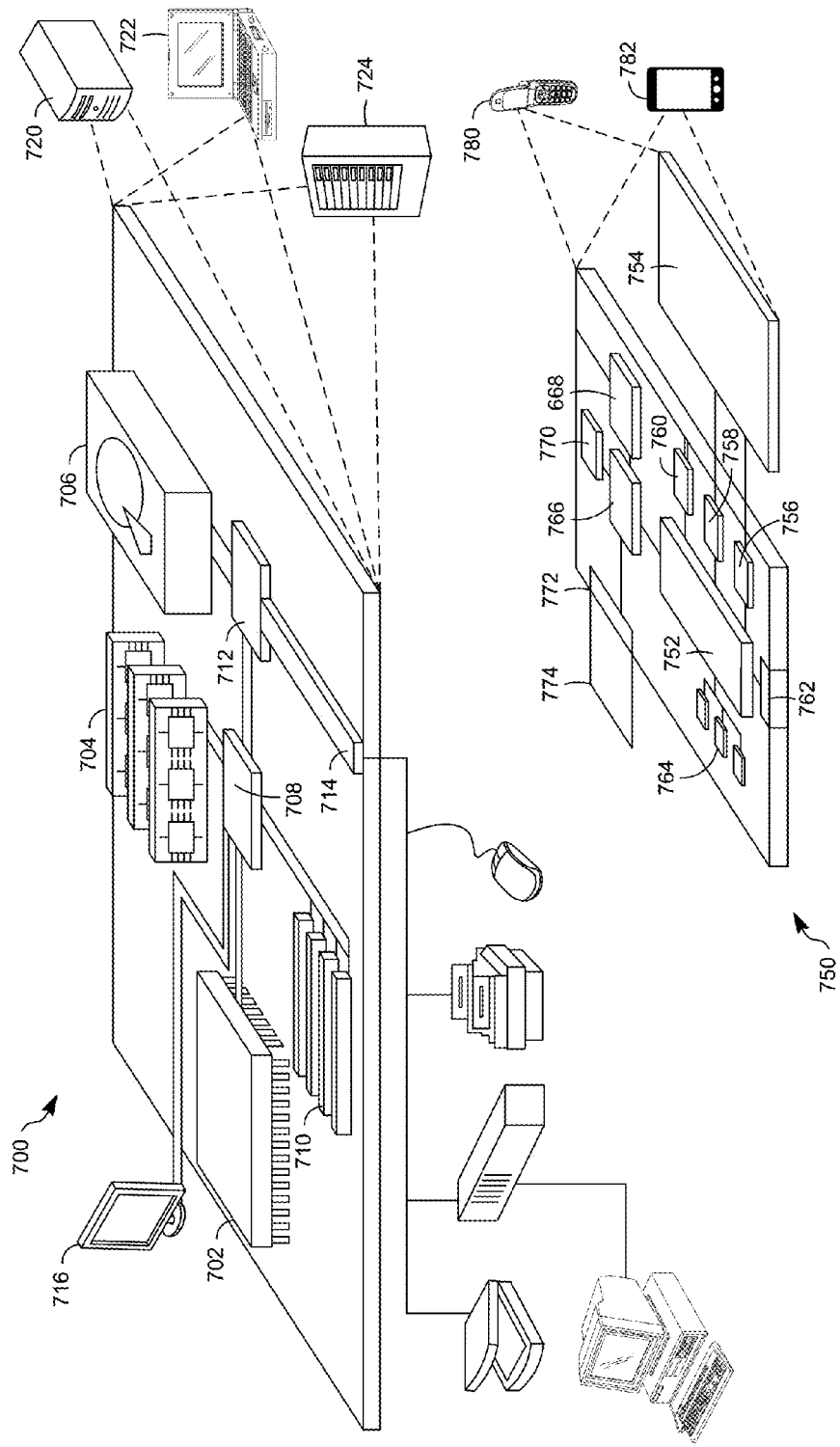
FIG. 8 illustrates an example of a computing device and a mobile computing device that can be used to implement the techniques described herein.

FIG. 8 provides an example of a generic electronic computing device 700 and a generic mobile electronic computing device 780, which may be included in a deep network. Computing device 700 is intended to represent various forms of digital computers, such as laptop computers, convertible computers, tablet computers, desktop computers, workstations, personal digital assistants, servers, blade servers, mainframes, and other appropriate computers. Computing device 780 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 600, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 780. Each of such devices may contain one or more of computing device 700, 780, and an entire system may be made up of multiple computing devices 700, 780 communicating with each other.

Computing device 780 includes a processor 782, memory 764, and an input/output device such as a display 784, a communication interface 766, and a transceiver 768, among other components. The device 780 may also be provided with a storage device, such as a microdrive or other device, to provide additional storage. Each of the components 780, 782, 764, 784, 766, and 768, are interconnected using various buses, and several of the components may be mounted on a common motherboard or in other manners as appropriate.

The processor 782 can execute instructions within the computing device 780, including instructions stored in the memory 764. The processor may be implemented as a chipset of chips that include separate and multiple analog and digital processors. The processor may provide, for example, for coordination of the other components of the device 780, such as control of user interfaces, applications run by device 780, and wireless communication by device 780.

Processor 782 may communicate with a user through control interface 788 and display interface 786 coupled to a display 784. The display 784 may be, for example, a TFT LCD (Thin-Film-Transistor Liquid Crystal Display) or an OLED (Organic Light Emitting Diode) display, or other appropriate display technology. The display interface 786 may comprise appropriate circuitry for driving the display 784 to present graphical and other information to a user. The control interface 788 may receive commands from a user and convert them for submission to the processor 782. For example, the control interface 788 may receive in input entered by a user via, for example, the keyboard 780, and transmit the input to the processor 782 for processing, such as, for entry of corresponding text into a displayed text box. In addition, an external interface 762 may be provide in communication with processor 782, so as to enable near area communication of device 780 with other devices. External interface 762 may provide, for example, for wired communication in some implementations, or for wireless communication in other implementations, and multiple interfaces may also be used.

The memory 764 stores information within the computing device 780. The memory 764 can be implemented as one or more of a computer-readable medium or media, a volatile memory unit or units, or a non-volatile memory unit or units. Expansion memory 774 may also be provided and connected to device 880 through expansion interface 772, which may include, for example, a SIMM (Single In Line Memory Module) card interface. Such expansion memory 774 may provide extra storage space for device 780, or may also store applications or other information for device 780. Specifically, expansion memory 774 may include instructions to carry out or supplement the processes described above, and may include secure information also. Thus, for example, expansion memory 774 may be provide as a security module for device 880, and may be programmed with instructions that permit secure use of device 880. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 874, or memory on processor 782, that may be received, for example, over transceiver 768 or external interface 762.

Device 780 may communicate wirelessly through communication interface 766, which may include digital signal processing circuitry where necessary. Communication interface 76 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 780, which may be used as appropriate by applications running on device 780.

Device 780 may also communicate audibly using audio codec 760, which may receive spoken information from a user and convert it to usable digital information. Audio codec 760 may likewise generate audible sound for a user, such as through a speaker, e.g., in a handset of device 780. Such sound may include sound from voice telephone calls, may include recorded sound (e.g., voice messages, music files, etc.) and may also include sound generated by applications operating on device 780.

The computing device 780 may be implemented in a number of different forms, as shown in the figure. For example, it may be implemented as a cellular telephone 780. It may also be implemented as part of a smart phone 782, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   accessing a plurality of posed image sets from a database, the plurality of posed image sets respectively corresponding to a plurality of scenes, each of the plurality of posed image sets including a plurality of views of a corresponding scene of the plurality of scenes;
   generating a requested view of a scene based on views selected from the plurality of views of the scene included in a posed image set corresponding to the scene in accordance with an automated view generating algorithm, wherein the requested view of the scene is not included in the plurality of views of the scene included in the corresponding posed image set;
   comparing the view of the scene generated by the automated view generating algorithm to a known view of the scene; and
   updating the view generating algorithm based on the comparison,
   wherein generating the requested view of the scene also includes:
      reprojecting depth slices of each of the selected views at a plurality of depths;
      applying the updated view generating algorithm to the reprojected depth slices and matching pixels of the reprojected depth slices of the selected views at corresponding depths; and
      determining a depth for a requested pixel of the requested view and a color for each pixel of the requested view at the determined depth.

2. The method of claim 1, wherein reprojecting depth slices of each of the selected views at a plurality of depths includes:
   determining an interval between adjacent depth slices of each of the plurality of depths, extending between a minimum reprojection distance and a maximum reprojection distance; and
   applying the determined interval to the reprojection of depth slices for each of the selected views.

3. The method of claim 1, wherein generating the requested view also includes:
   determining, for each pixel, a probability that the pixel is located at a particular depth;
   multiplying the determined probability by a computed color for the pixel; and
   summing the resulting products of the multiplication to generate the requested view.

4. The method of claim 3, wherein determining, for each pixel, a probability that the pixel is located at a particular depth slice includes:
   generating, by a selection tower, a probability map for each of the plurality of depths;
   generating, by a color tower, a color output image for each of the plurality of depths; and
   determining, based on the color output image generated for each of the plurality of depths and the probability map generated for each of the plurality of depths, a selection probability for each pixel representing a probability that the pixel is at a particular depth.

5. The method of claim 3, further comprising:
iteratively performing the generating and comparing until the requested view of the image matches the known view of the requested view of the scene within a predetermined threshold.

6. A method, comprising:
receiving a request for a view of a scene to be rendered;
accessing, from a database, a plurality of stored posed images respectively representing a plurality of views of the scene;
selecting a plurality of images from the plurality of stored posed images, the selected plurality of images representing views of the scene neighboring the requested view of the scene;
reprojecting depth slices of each of the selected plurality of images at a plurality of depths;
determining a depth for the requested view of the scene and determining a color for each pixel of the requested view of the scene at the determined depth based on pixels at the reprojected depth slices; and
generating the requested view of the scene.

7. The method of claim 6, wherein reprojecting depth slices of each of the selected plurality of images at a plurality of depths includes:
determining an interval between adjacent depth slices of each of the plurality of depth slices, extending between a minimum reprojection distance and a maximum reprojection distance; and
applying the determined interval to the reprojection of depth slices for each of the selected plurality of images.

8. The method of claim 6, wherein determining a depth for the requested view and determining a color for each pixel of the requested view at the determined depth based on pixels at the reprojected depth slices includes:
matching pixels of the reprojected depth slices of the selected plurality of images at corresponding depths; and
determining a depth for a requested pixel of the requested view and a color for each pixel of the requested view at the determined depth.

9. The method of claim 8, wherein generating the requested view includes:
determining, for each pixel, a probability that the pixel is located at a particular depth slice;
multiplying the determined probability by a computed color for the pixel; and
summing the resulting products of the multiplication to generate the requested view.

10. A method, comprising:
receiving a request for a view of a scene;
retrieving, from a database storing a plurality of posed image sets, a posed image set corresponding to the requested view of the scene, each posed image set of the plurality of posed images sets stored in the database including a plurality of views of a corresponding scene, wherein the requested view of the scene is not included in the plurality of views of the scene of the retrieved posed image set; and
generating the requested view of the scene based on selected views from the plurality of views of the scene included in the retrieved posed image set, including:
reprojecting depth slices of each of the selected views at a plurality of depths; and
determining a depth for the requested view of the scene, and a color for each pixel of the requested view of the scene at the determined depth, to generate the requested view of the scene.

11. The method of claim 10, wherein reprojecting depth slices of each of the selected views at a plurality of depths includes:
determining an interval between adjacent depth slices of each of the plurality of depths, extending between a minimum reprojection distance and a maximum reprojection distance; and
applying the determined interval to the reprojection of depth slices for each of the selected views.

12. The method of claim 10, wherein determining a depth for the requested view and determining a color for each pixel of the requested view at the determined depth includes:
matching pixels of the reprojected depth slices of the selected views at corresponding depths; and
determining a depth for a requested pixel of the requested view and a color for each pixel of the requested view at the determined depth.

13. The method of claim 12, wherein generating the requested view includes:
determining, for each pixel, a probability that the pixel is located at a particular depth slice;
multiplying the determined probability by a computed color for the pixel; and
summing the resulting products of the multiplication to generate the requested view.

14. A system for generating a view of a scene, the system comprising:
a network, including:
a computing device including a processor, the computing device being in communication with a database, the database storing a plurality of posed image sets respectively corresponding to a plurality of scenes, each of the plurality of posed images sets including a plurality of views of a corresponding scene of the plurality of scenes;
a selection tower configured to determine a depth for each output pixel in a requested output image, the requested output image corresponding to a requested view of a scene; and
a color tower configured to generate a color for each output pixel of the requested output image,
wherein the selection tower and the color tower are configured to receive selected views from the plurality of views of the scene included in the posed image set corresponding to the requested view of the scene, the requested view of the scene not being included in the plurality of views of the scene of the corresponding posed image set, and
the selection tower and the color tower are configured to generate the requested output image for processing by the processor of the computing device to generate the requested view of the scene.

15. The system of claim 14, wherein the selection tower and the color tower are configured to:
reproject depth slices of each of the selected views at a plurality of depths;
determine an interval between adjacent depth slices of each of the plurality of depths, extending between a minimum reprojection distance and a maximum reprojection distance; and
apply the determined interval to the reprojection of depth slices for each of the selected views.

16. The system of claim 15, wherein the selection tower and the color tower are further configured to:
determine, for each pixel, a probability that the pixel is located at a particular depth, multiply the determined probability by a computed color for the pixel provided by the color tower, and sum the resulting products of the multiplication to generate the requested view.

17. The system of claim 16, wherein, in determining, for each pixel, a probability that the pixel is located at a particular depth slice, the selection tower is configured to generate a probability map for each of the plurality of depths, the color tower is configured to generate a color output image for each of the plurality of depths, and the selection tower is configured to determine, based on the color output image generated for each of the plurality of depths and the probability map generated for each of the plurality of depths, a selection probability for each pixel representing a probability that the pixel is at a particular depth.

18. The system of claim 17, wherein the selection tower and the color tower are configured to iteratively generate the probability map and the color output image until the requested view of the scene matches a known view of the requested view of the scene within a predetermined threshold.

* * * * *